United States Patent
Hietalahti et al.

(10) Patent No.: US 11,516,351 B2
(45) Date of Patent: Nov. 29, 2022

(54) BACK-OFF TIMER FOR NETWORK REATTACHMENT

(71) Applicant: NOKIA SOLUTIONS AND NETWORKS OY, Espoo (FI)

(72) Inventors: Hannu Petri Hietalahti, Kiviniemi (FI); Jussi-Pekka Koskinen, Oulu (FI); Jennifer Liu, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 31 days.

(21) Appl. No.: 16/494,182

(22) PCT Filed: Mar. 15, 2017

(86) PCT No.: PCT/US2017/022494
§ 371 (c)(1),
(2) Date: Sep. 13, 2019

(87) PCT Pub. No.: WO2018/169523
PCT Pub. Date: Sep. 20, 2018

(65) Prior Publication Data
US 2020/0092425 A1 Mar. 19, 2020

(51) Int. Cl.
*H04M 15/00* (2006.01)
*H04W 76/18* (2018.01)
(Continued)

(52) U.S. Cl.
CPC .......... *H04M 15/88* (2013.01); *H04W 48/02* (2013.01); *H04W 48/16* (2013.01); *H04W 48/18* (2013.01); *H04W 60/04* (2013.01); *H04W 76/18* (2018.02)

(58) Field of Classification Search
CPC ..... H04M 15/88; H04W 76/18; H04W 48/02; H04W 48/16; H04W 48/18; H04W 60/04; H04W 60/00
See application file for complete search history.

(56) References Cited

U.S. PATENT DOCUMENTS 9,877,198 B1 * 1/2018 Liu .................. H04W 12/08
9,900,801 B2 * 2/2018 Papa ................ H04W 28/0247
(Continued)

FOREIGN PATENT DOCUMENTS

CN 102421141 A 4/2012
CN 102548008 A 7/2012
(Continued)

OTHER PUBLICATIONS

3GPP document (3GPP TS 24.301 v13.8.0, published Dec. 16, 2016 retrieved from https://www.3gpp.org/ftp/Specs/archive/24_series/24.301/ (Year: 2016).*
(Continued)

*Primary Examiner* — Nishant Divecha
(74) *Attorney, Agent, or Firm* — Alston & Bird LLP

(57) ABSTRACT

Various communication systems may benefit from improved network signaling or attachment. A method, in certain embodiments, may include receiving at a network node an initial attachment request message from a user equipment. The method may also include issuing a back-off timer when accepting the initial attachment request from the user equipment. The back-off timer may include a duration of time in which the user equipment is not allowed to reattach to a network. In addition, the method may include receiving at the network node another attachment request message from the user equipment. Further, the method may include determining whether the duration of the back-off timer has lapsed, and rejecting the another attachment request from the user equipment when the duration of time of the back-off timer has not lapsed.

17 Claims, 5 Drawing Sheets

(51) Int. Cl.
  *H04W 48/02* (2009.01)
  *H04W 48/16* (2009.01)
  *H04W 48/18* (2009.01)
  *H04W 60/04* (2009.01)

(56) References Cited

U.S. PATENT DOCUMENTS

| | | | |
|---|---|---|---|
| 10,034,325 | B2* | 7/2018 | Lin .................. H04W 28/0289 |
| 2011/0199905 | A1 | 8/2011 | Pinheiro et al. |
| 2012/0002545 | A1 | 1/2012 | Watfa et al. |
| 2012/0106332 | A1 | 5/2012 | Tiwari |
| 2012/0208486 | A1 | 8/2012 | Liao |
| 2012/0238236 | A1 | 9/2012 | Liao |
| 2013/0016607 | A1 | 1/2013 | Tiwari |
| 2013/0028084 | A1 | 1/2013 | Aoyagi et al. |
| 2013/0083646 | A1* | 4/2013 | Hietalahti ............ H04W 76/30 370/216 |
| 2014/0126536 | A1* | 5/2014 | Niemi .................. H04W 60/02 370/331 |
| 2014/0194150 | A1 | 7/2014 | Wang et al. |
| 2015/0181462 | A1* | 6/2015 | Iwai ..................... H04W 28/16 370/229 |
| 2015/0257115 | A1* | 9/2015 | Jokimies ............. H04W 60/00 455/435.1 |
| 2015/0341889 | A1 | 11/2015 | Starsinic et al. |
| 2016/0057652 | A1 | 2/2016 | Chandramouli et al. |
| 2016/0323774 | A1 | 11/2016 | Landais et al. |
| 2017/0238198 | A1 | 8/2017 | Shibayama |

FOREIGN PATENT DOCUMENTS

| | | |
|---|---|---|
| CN | 102754485 A | 10/2012 |
| CN | 102843765 A | 12/2012 |
| CN | 104904243 A | 9/2015 |
| CN | 106031105 A | 10/2016 |
| EP | 2 448 345 A2 | 5/2012 |
| JP | 2011-228805 A | 11/2011 |
| JP | 2016-028464 A | 2/2016 |
| JP | 2017-504258 A | 2/2017 |
| WO | WO 2016/021287 | 2/2016 |
| WO | WO 2018/083368 A1 | 5/2018 |

OTHER PUBLICATIONS

Office Action for corresponding Japanese Application No. 2019-572344 dated Oct. 1, 2020, 7 pages.
Extended European Search Report for Application No. 17901200.0 dated Oct. 19, 2020, 11 pages.
3GPP TS 23.401 V14.3.0, 3rd Generation Partnership Project; Technical Specification Group Services and System Aspects; General Packet Radio Service (GPRS) Enhancements for Evolved Universal Terrestrial Radio Access Network (E-UTRAN) Access (Release 14) (Mar. 2017), 386 pages.
International Search Report and Written Opinion for Application No. PCT/US2017/022494 dated May 23, 2017, 7 pages.
3GPP TS 23.501, $3^{rd}$ Generation Partnership Project; Technical Specification Group Services and Systems Aspects; System Architecture for the 5G System; Stage 2 (Release 15) (dated Mar. 2017) 101 pages.
3GPP TS 23.401 V14.1.0, $3^{rd}$ Generation Partnership Project; Technical Specification Group Services and System Aspects; General Packet Radio Service (GPRS) Enhancements for Evolved Universal Terrestrial Radio Access Network (E-UTRAN) Accsss (Release 14) (Sep. 2016), 379 pages.
3GPP TS 24.301 V14.0.1, $3^{rd}$ Generation Partnership Project; Technical Specification Group Core Network and Terminals; Non-Access-Stratum (NAS) Protocol for Evolved Packet System (EPS); Stage 3 (Release 14) (Jun. 2016), 452 pages.
3GPP TS 23.682 V15.0.0, $3^{rd}$ Generation Partnership Project; Technical Specification Group Services and System Aspects; Architecture Enhancements to Facilitate Communications with Packet Data Networks and Applications (Release 15) (Mar. 2017) 109 pages.
3GPP TS 29.061 V14.3.0, $3^{rd}$ Generation Partnership Project; Technical Specification Group Core Network and Terminals; Interworking Between the Public Land Mobile Network (PLMN) Supporting Packet Based Services and Packet Data Networks (PDN) (Release 14) (Mar. 2017) 171 pages.
3GPP Ts 24.008 V16.3.0, $3^{rd}$ Generation Partnership Project; Technical Specification Group Core Network and Terminals; Mobile Radio Interface Layer 3 Specification; Core Network Protocols; Stage 3 (Release 16) (dated Jun. 2019, 793 pages.
3GPP TS 29.128 V16.0.0, $3^{rd}$ Generation Partnership Project; Technical Specification Group Core Network and Terminals; Mobility Management Entity (MME) and Serving Gprs Support Node (SGSN) Interfaces for Interworking With Packet Data networks and Applications (Release 16) (dated Sep. 1, 2019) 51 pages.
*Interim Agreement for UE Preferences*, S2-167093, SA WG2 Meeting #118 (Nov. 2016) 6 pages.
Office Action for Vietnamese Application No. 1-2019-05527 dated Nov. 27, 2019, 2 pages.
Office Action for Korean Application No. 10-2019-7029908, dated Dec. 22, 2020, with English translation, 15 pages.
3GPP TS 23.401, 3rd Generation Partnership Project; Technical Specification Group Services and System Aspects; General Packet Radio Service (GPRS) Enhancements For Evolved Universal Terrestrial Radio Access Network (E- UTRAN) Access (Release 13) (dated Mar. 2017), 375 pages.
Search Report and Written Opinion for Singapore Application No. 11201908519S dated Jan. 1, 2021, 8 pages.
Office Action for Chinese Application No. 2017800905640 dated Apr. 19, 2021, 11 pages.
Decision to Grant for Japanese Application No. 2019-572344 dated May 20, 2021, 5 pages.
Decision to Grant for Korean Application No. 10-2019-7029908 dated Jul. 6, 2021, 2 pages.
Decision on Acceptance for Vietnam Application No. 1-2019-05527 dated Mar. 27, 2020, 2 pages.
First Examination Report for Indian Application No. 201947039185 dated Aug. 13, 2021, 7 pages.
Office Action for Thailand Application No. 1901005728 dated Nov. 17, 2021, 3 pages.
Office Action for Chinese Application No. 201780090564.0 dated Nov. 18, 2021, 9 pages.
Office Action for Chinese Application No. 2017800905640 dated Mar. 8, 2022, 7 pages.
Office Action for Indonesian Application No. P00201908388 dated Sep. 6, 2022, 4 pages.

* cited by examiner

BACK-OFF TIMER FOR NETWORK REATTACHMENT

CROSS-REFERENCE TO RELATED APPLICATIONS

The present application is a national phase entry of International Application No. PCT/US2017/022494, filed Mar. 15, 2017, the contents of which are incorporated herein by reference in its entirety.

BACKGROUND

Field

Various communication systems may benefit from improved network signaling and attachment. For example, certain communication systems may benefit from a back-off timer that prevents reattachment of a user equipment to a network during the duration of the timer.

Description of the Related Art

Given the current grown rate of cellular technology, it is predicted that there will be over 20 billion wirelessly connected Internet of Things (IoT) devices by the year 2020. A significant number of these devices may be cellular IoT devices that are connected by cellular networks. Cellular IoT devices, also referred to as cellular IoT user equipment (UE), generate bursty and infrequent traffic, and have been optimized for infrequent, small data transfer. Transmitting small data frequently, however, consumes more network resources than sending a larger amount of data at a low frequency.

Mobile service providers typically design their cost model to charge users based on a total amount of data usage in a predetermined period of time. For example, mobile service providers charge users for the number of messages sent within a given month. Providers often also utilize rate control methods that can limit or restrict the overall number of messages that the UE can transmit in a given unit of time. A rate control method that restricts the number of messages transmitted may include a rate control quota, where the quota defines the number of messages the UE can send in a given unit of time. Such limits or restrictions on the overall number of messages are imposed on the UE upon attachment to the network.

Data limits or restrictions, such as a rate control quota, operate under the assumption that the UE remains attached to the network. Rate control methods therefore apply to the UE from the time the UE attaches to the network until the UE detaches from the network. However, a UE who detaches and thereafter reattaches to the same network receives a new data limit quota. As such, in order to bypass or avoid the imposed data limit or restriction, the UE would simply have to reattach to the network.

SUMMARY

According to certain embodiments, an apparatus may include at least one memory including computer program code, and at least one processor. The at least one memory and the computer program code may be configured, with the at least one processor, to cause the apparatus at least to receive at a network node an initial attachment request message from a user equipment. The at least one memory and the computer program code may also be configured, with the at least one processor, to cause the apparatus at least to issue a back-off timer when accepting the initial attachment request from the user equipment. The back-off timer may include a duration of time in which the user equipment is not allowed to reattach to a network. In addition, the at least one memory and the computer program code may be configured, with the at least one processor, to cause the apparatus at least to receive at the network node another attachment request message from the user equipment. Further, the at least one memory and the computer program code may be configured, with the at least one processor, to cause the apparatus at least to determine whether the duration of the back-off timer has lapsed, and reject the another attachment request from the user equipment when the duration of time of the back-off timer has not lapsed.

A method, in certain embodiments, may include receiving at a network node an initial attachment request message from a user equipment. The method may also include issuing a back-off timer when accepting the initial attachment request from the user equipment. The back-off timer may include a duration of time in which the user equipment is not allowed to reattach to a network. In addition, the method may include receiving at the network node another attachment request message from the user equipment. Further, the method may include determining whether the duration of the back-off timer has lapsed, and rejecting the another attachment request from the user equipment when the duration of time of the back-off timer has not lapsed.

An apparatus, in certain embodiments, may include means for receiving at a network node an initial attachment request message from a user equipment. The apparatus may also include means for issuing a back-off timer when accepting the initial attachment request from the user equipment. The back-off timer may include a duration of time in which the user equipment is not allowed to reattach to a network. In addition, the method may include means for receiving at the network node another attachment request message from the user equipment. Further, the method may include means for determining whether the duration of the back-off timer has lapsed, and means for rejecting the another attachment request from the user equipment when the duration of time of the back-off timer has not lapsed.

According to certain embodiments, a non-transitory computer-readable medium encoding instructions that, when executed in hardware, perform a process. The process may include receiving at a network node an initial attachment request message from a user equipment. The process may also include issuing a back-off timer when accepting the initial attachment request from the user equipment. The back-off timer may include a duration of time in which the user equipment is not allowed to reattach to a network. In addition, the process may include receiving at the network node a reattachment request message from the user equipment. Further, the process may include determining whether the duration of the back-off timer has lapsed, and rejecting the another attachment request from the user equipment when the duration of time of the back-off timer has not lapsed.

According to certain other embodiments, a computer program product may encode instructions for performing a process. The process may include receiving at a network node an initial attachment request message from a user equipment. The process may also include issuing a back-off timer when accepting the initial attachment request from the user equipment. The back-off timer may include a duration of time in which the user equipment is not allowed to reattach to a network. In addition, the process may include receiving at the network node a reattachment request message from the user equipment. Further, the process may include determining whether the duration of the back-off timer has lapsed, and rejecting the another attachment request from the user equipment when the duration of time of the back-off timer has not lapsed.

According to certain embodiments, an apparatus may include at least one memory including computer program code, and at least one processor. The at least one memory and the computer program code may be configured, with the at least one processor, to cause the apparatus at least to send from a user equipment to a network node an initial attachment request message. The at least one memory and the computer program code may also be configured, with the at least one processor, to cause the apparatus at least to receive a response from the network node indicating that the initial attachment request message is accepted. The response may include a back-off timer or an indication of the back-off timer, and the back-off timer may include a duration of time in which the user equipment is not allowed to reattach to a network. In addition, the at least one memory and the computer program code may be configured, with the at least one processor, to cause the apparatus at least to start the back-off timer associated with the user equipment. Further, the at least one memory and the computer program code may be configured, with the at least one processor, to cause the apparatus at least to refrain from reattach to the network until after the duration of time of the back-off timer has lapsed.

A method, in certain embodiments, may include sending from a user equipment to a network node an initial attachment request message. The method may also include receiving a response from the network node indicating that the initial attachment request message is accepted. The response may include a back-off timer, and the back-off timer may include a duration of time in which the user equipment is not allowed to reattach to a network. In addition, the method may include starting the back-off timer associated with the user equipment. Further, the method may include refraining from reattaching to the network until after the duration of time of the back-off timer has lapsed.

An apparatus, in certain embodiments, may include means for sending from a user equipment to a network node an initial attachment request message. The apparatus may also include means for receiving a response from the network node indicating that the initial attachment request message is accepted. The response may include a back-off timer or an indication of the back-off timer, and the back-off timer may include a duration of time in which the user equipment is not allowed to reattach to a network. In addition, the apparatus may include means for starting the back-off timer associated with the user equipment. Further, the apparatus may include means for refraining from reattaching to the network until after the duration of time of the back-off timer has lapsed.

According to certain embodiments, a non-transitory computer-readable medium encoding instructions that, when executed in hardware, perform a process. The process may include sending from a user equipment to a network node an initial attachment request message. The process may also include receiving a response from the network node indicating that the initial attachment request message is accepted. The response may include a back-off timer or an indication of the back-off timer, and the back-off timer may include a duration of time in which the user equipment is not allowed to reattach to a network. In addition, the process may include starting the back-off timer associated with the user equipment. Further, the process may include refraining from reattaching to the network until after the duration of time of the back-off timer has lapsed.

According to certain other embodiments, a computer program product may encode instructions for performing a process. The process may include sending from a user equipment to a network node an initial attachment request message. The process may also include receiving a response from the network node indicating that the initial attachment request message is accepted. The response may include a back-off timer or an indication of the back-off timer, and the back-off timer may include a duration of time in which the user equipment is not allowed to reattach to a network. In addition, the process may include starting the back-off timer associated with the user equipment. Further, the process may include refraining from reattaching to the network until after the duration of time of the back-off timer has lapsed.

BRIEF DESCRIPTION OF THE DRAWINGS

For proper understanding of the invention, reference should be made to the accompanying drawings, wherein.

DETAILED DESCRIPTION

Figure 1:
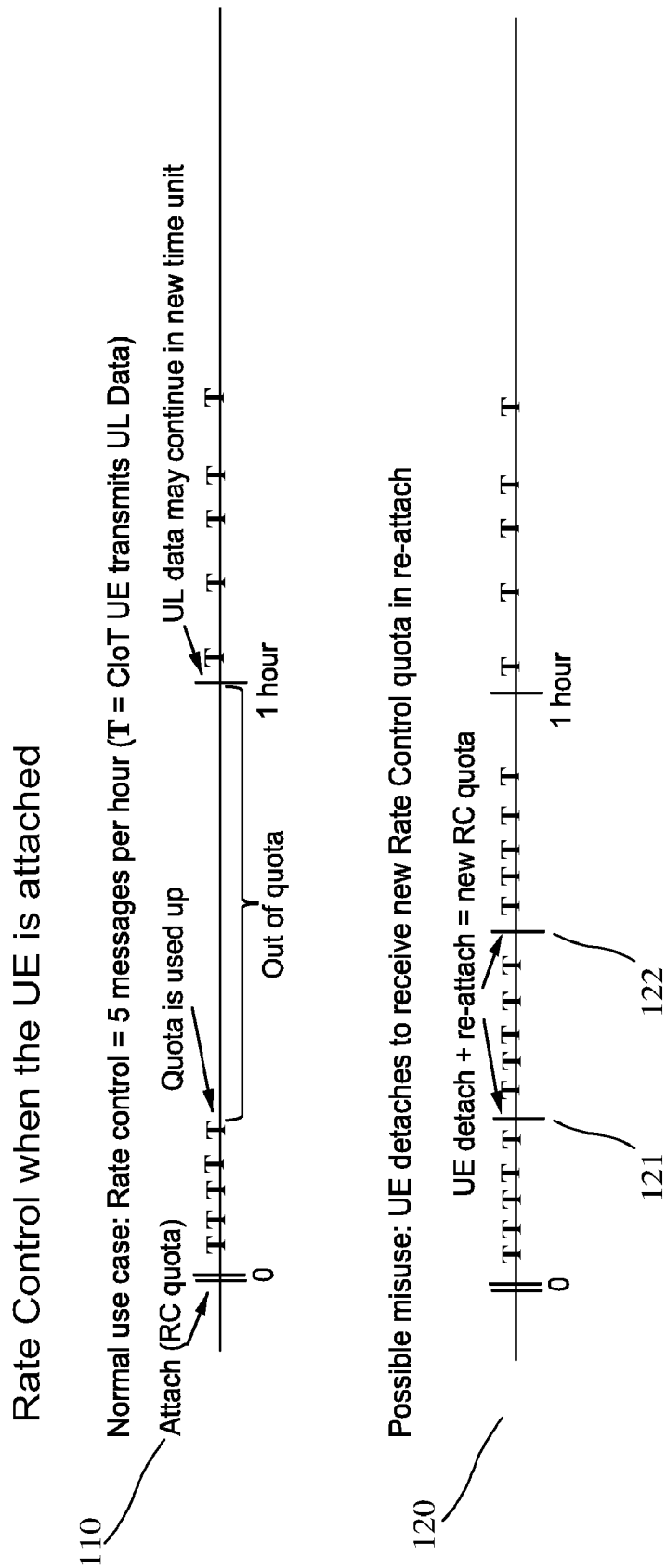
FIG. 1 illustrates an example of an attach cycle according to certain embodiments.

Certain embodiments allow for real-time tracking of how frequently a UE, such as a cellular IoT device, attempts to attach to the network within a given time period. Based on the real-time tracking, a network node may control the network access frequency of the UE by imposing a timer, for example an attach back-off timer. The attach back-off timer may also be referred to simply as a back-off timer. In other embodiments the attach back-off timer may be referred to as an attach timer, a reattach timer, or a re-registration timer. The back-off timer may include a duration of time in which the UE is not allowed to reattach to the network. The network may be any type of communications network, for example a public land mobile network (PLMN). Use of the back-off timer may help to prevent users from bypassing data limit quotas by detaching and shortly thereafter reattaching to the network. In addition, the UE may deregister or detach from the network when no data is being transmitted. Such UE power savings may trigger excessive frequency registration or attachment to the network. By prohibiting such behavior, the network operator may reduce the signaling load of the network, and prevent unfair network usage by certain UEs.

A network node may be able to control the network access frequency of the UE. The network node may be a network entity located in a third generation partnership project (3GPP) core network, such as an evolved packet system (EPS) mobile management entity (MME) or a $5^{th}$ generation (5G) Access and Mobility Management Function (AMF), as described in 3GPP TS 23.501. 3GPP TS 32.501 is hereby incorporated by reference in its entirety. The UE may detach from the network and then attempt to shortly reattach, within the time unit associated with the control rate quota.

In other embodiments, the UE may remain attached to the network, and send another attachment request, also referred to as a reattachment request message in certain embodiments, to the network while still remaining attached to the network. In some embodiments involving 3GPP 4$^{th}$ generation (4G) technology, the back-off timer may block a reattachment request received after the UE detaches, but allow other types of requests, such as a tracking area update (TAU) request, as long as the UE remains attached to the network. In 5G technology that include a registration request procedure, the initial registration request may be blocked by the back-off timer, in certain embodiments, while registration updates may be allowed, when the UE remains attached to the network.

Certain embodiments may be used to limit or restrict excessive UE reattachment to the network. In other words, the network node may prevent the misuse of network resources by a UE who attempts to reattach to the same network one or more times within a given time period. Such limits or restrictions help to reduce the signaling load on the core network, as well as prevent fraudulent attempts by the user to bypass imposed network rate control through reattachment.

FIG. 1 illustrates an example of an attach cycle according to certain embodiments. In particular, FIG. 1 illustrates an attach cycle 110 in which the UE remains attached to the network throughout the cycle, without attempting to detach or reattach. In attach cycle 110, the rate control (RC) limit or RC quota may be 5 messages per hour. T in FIG. 1 represents an uplink message transmitted from the user equipment to the network node. The RC quota of five messages is a per hour quota, meaning that after each hour the RC quota restarts. RC, for example, may be an access point name (APN) rate control and/or a serving public land mobile network (SPLMN) rate control.

At time zero of attach cycle 110, the UE transmits 5 uplink messages to the network node. After sending 5 messages, the UE may be prevented from sending any additional messages during the remaining time within the hour by an RC quota. For example, if the UE sends 5 messages within the first ten minutes, the UE may be prohibited from sending any additional messages to the network for the remaining 50 minutes. The RC quota may be imposed on the UE by a network node or may be self-imposed by the UE itself In certain embodiments, the UE may receive the rate control quota upon attaching to the network. After the remaining time duration of one hour lapses, the UE may send 5 additional uplink messages to the network node during the next hour. Once the 5 messages are transmitted, however, the UE is again prevented from sending additional messages for the remaining time within the hour.

In a second cycle 120 shown in FIG. 1, after the UE sends 5 messages, instead of waiting for the remaining hour to lapse to be able to send additional messages, the UE detaches and then reattaches to the same network, as shown at time 121. By detaching and reattaching to the same network, the UE may receive a new rate control quota that can allow it to transmit additional messages before the remaining time period within the hour has lapsed. As can be seen in FIG. 1, at time 121, the UE detaches and reattaches to the network. The UE then sends 5 more messages to the network node, and then again detaches and reattaches to receive a new radio control quota at time 122. By simply detaching and reattaching to the network, the UE may be able to bypass the 5 message RC quota per hour. In the example shown in FIG. 1, the UE manages to send 15 messages in a one hour period, which exceeds the allotted limit by 10 messages.

Figure 2:
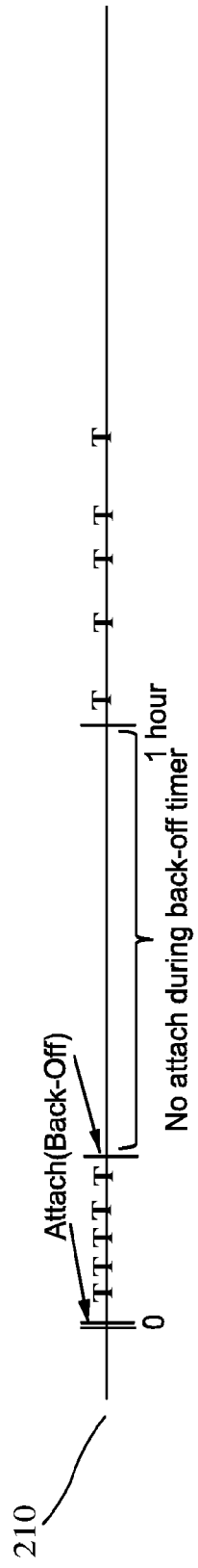
FIG. 2 illustrates an example of an attach cycle according to certain embodiments.

Certain embodiments may help to prevent the UE from detaching and reattaching to the same network in order to circumvent the imposed rate control quota. FIG. 2 illustrates an example of an attach cycle according to certain embodiments. In particular, FIG. 2 illustrates a cycle 210 with use of a back-off timer that is configured to prevent a UE from reattaching to the network during a given duration. In certain embodiments, the duration of the back-off timer may be based on the duration of the rate control quota. For example, when the RC quota is 5 messages per hour, the duration of the back-off timer may be one hour or one hour minus the time at which the last of the 5 messages was sent.

As can be seen in FIG. 2, once a UE attaches to a network, it may be able to transmit, for example, 5 messages per hour. In some embodiments, once the UE transmits the allotted 5 messages, a back-off timer may then be started or triggered. If the UE attempts to reattach to the network during the duration of the back-off timer, the network may prevent the network from reattaching until after the back-off timer has lapsed. For example, if the rate control quota limits the UE to 5 messages per hour, and the UE transmits all 5 messages within 15 minutes, the back-off timer may last for 45 minutes. Once the back-off timer expires, the UE may be permitted to reattach to the network, at which point the rate control quota may restart for the UE.

In other embodiments, the back-off timer may equal the duration of the imposed rate control quota. For example, if the user equipment is restricted to sending 5 messages per hour, then the back-off timer may start when the UE attaches to the network. The back-off timer may then have a duration of one hour, during which the UE may not be allowed to reattach to the same network. The back-off timer may restart every hour. The restart of the back-off timer may align with the restart of the duration of the RC quota.

The back-off timer, in certain embodiments, and/or the duration of the back-off timer, may be determined and issued by the network node. The network node may issue a back-off timer when accepting an initial attachment request from the user equipment. Issuing the back-off timer may include determining and sending the user equipment the back-off timer that has been determined by the network node and/or sending the user equipment an indication to use a preconfigured timer. The network node may then store or memorize the back-off timer duration, and issue and/or indicate the back-off timer or the duration of the back-off timer to the UE. The back-off timer may be transmitted, in some embodiments, using an access network signaling procedure and/or a non-access stratum (NAS) signaling procedure. For example, the back-off timer may be indicated to the UE as part of a radio resource control (RRC) connection release, a TAU, a service request message, and/or a control plane service request or detach message. Although the network node transmits the back-off timer to the UE, the network node may still continue to keep track of the duration of the back-off timer.

The back-off timer, in some embodiments, can be issued and/or indicated to the UE from the network node via a message that acknowledged that the reattachment request has been received. In such an embodiment, the network node may not reject the reattachment request of the UE. Rather, the network may be able to inform the UE that the network node intends to process the request when or after the duration of the back-off timer has lapsed, but indicates to the UE to avoid reattachment during the duration of the back-off timer.

In other embodiments, the back-off timer may be pre-configured in the UE. The pre-configuring, for example, may be done by the network node upon the initial attachment of the UE to the network. In another example, the UE may be pre-configured with the back-off timer when registering with the mobile service operator. The back-off timer pre-configured in the UE may restrict the ability of the UE to reattach to the same network during the duration of the back-off timer. In other words, the UE may be restricted from even sending a reattachment request to the network during the duration of the back-off timer. The UE may know to start the duration of the back-off timer upon receiving an indication from the network.

In yet another embodiment, however, the pre-configured back-off timer may be included in the reattachment request sent from the UE to the network. A network node may detect the back-off timer associated with the UE, and delay the reattachment of the UE until after the duration of the back-off timer lapses. Enforcement of the back-off timer may therefore be done by either the UE itself or by the network node.

The UE that has either received the back-off timer, or that may have been pre-configured with the back-off timer, may start the duration of the back-off timer upon detachment from the network. The UE may then not be able to reattach to the same network until after the duration of the back-off timer lapses. In some other embodiments, the duration of the back-off timer may be started when the UE receives the indication from the network. The indication from the network may function as a start command for the back-off timer, whether the back-off timer was pre-configured at the UE or received at the UE from the network node. Yet in other embodiments, the start of the duration of the back-off timer may be implicit. An implicit start may be caused by any action by the network that may lead to the detachment of the UE. The start may be said to be implicit because an action other than detachment starts the duration of the timer. For example, receiving an RRC connection release may lead to the detachment or de-registration of the UE, which may be an implicit trigger to start the back-off timer.

During the duration of the back-off timer the UE, in certain embodiments, may not only be restricted from reattaching to the same network, but also may be restricted from requesting attachment to a different network. In some embodiments, the UE may only be restricted from attaching to a different network to avoid the impact of the back-off timer. The UE may, however, be allowed to select a different network for any other reason, other than avoiding the back-off timer. For example, if the UE loses coverage of the serving network, then the back-off timer may not prevent the selection of a different network in order to regain coverage. The back-off timer, therefore, may not impact some network selection rules, such as PLMN selection rules, when the UE loses coverage.

In certain embodiments, the UE may be allowed to remain attached after receiving the back-off timer. In other words, the UE may transmit the re-registration request to the network node without detaching or deregistering from the network. During the duration of the back-off timer, the UE may be able to transmit other messages to the network including a registration update request. However, if the UE deregisters or detaches from the network, it may not be allowed to perform new initial registration procedure until the back-off timer expires. The transmission of the other messages may still be restricted or limited by the control rate quota, or any other possible applicable restriction, and the attach back-off timer may not affect such other messages.

As discussed above, the back-off timer may be operated at both the network node and the UE, in some embodiments. The UE may attempt to violate the back-off timer, and sends a reattachment request to the network before the duration of the back-off timer has lapsed. Upon receiving the request the network may check the back-off timer operated at the network node. If the duration of the back-off timer has not lapsed, the network node may reject the reattachment request. When rejecting the reattachment request the network may specify to the UE the reason for the rejection. For example, the reason may be that the duration of the back-off timer has not lapsed. In other embodiments, the network node may include the attach back-off timer in the rejection message sent to the UE. In certain embodiments, the back-off timer may be received in positive acknowledgement without the network node rejecting the request. The back-off timer may allow other traffic, including user data and/or signaling, as long as the UE does not detach or deregister from the network.

The back-off timer may continue to operate in the network node even when the UE is no longer registered. Just as the UE may detach and attempt to reattach to the same network in order to gain a new rate control quota, in some embodiments the UE may attempt to deregister and then reregister with the same network. In such embodiments, the network node may continue to operate the back-off timer in order to prevent a reregistered UE from being able to circumvent the imposed rate control quota.

In certain embodiments, the network may allow for some prioritized UEs, such as UEs having high priority signaling, to reattach to the network during the duration of the back-off timer. The priority of the UE may be indicated to the network in the reattachment request message sent to the network. UEs with high priority signaling, such as exception reporting or emergency signaling, may be allowed to reattach the network and receive a new radio controller quota. For example, when the UE is running a critical application that needs connectivity during the duration of the back-off timer, the back-off timer, which may be received as a response to the reattach request, may not prevent the attachment of the UE to the network. The back-off timer may in some embodiments allow or not prevent either an emergency attachment or an attachment of a UE running a critical application.

In certain embodiments, the back-off timer may prevent a reattachment of a UE having the same priority level as a priority level of the back-off timer. In other words, the back-off timer may include a priority level associated with the timer. For example, the back-off timer may be associated with a low or a normal priority, which may not prevent UEs with high level priority from reattaching to the network.

UEs with low or normal priority signaling, in certain embodiments, may not warrant reattachment, and the UE may not initiate reattachment requests for low or normal priority signaling. In some embodiments, an indication may be included as part of the back-off timer of whether the timer may be applicable to all signaling, or merely applicable to non-prioritized signaling, such as normal or low priority signaling. In some embodiments, a given UE may be authorized as a prioritized UE by the network in order to be considered a prioritized UE that can reattach during the duration of the back-off timer.

In some embodiments, the network node may apply the back-off timer selectively on different UEs, or may selectively apply a different back-off timer to different UEs. UEs having different subscriptions may have the back-off timer selectively applied by the network node selectively. For example, a UE with a subscription having a higher data limit may also have a shorter back-off timer duration than a subscription having a lower data limit. The different levels of subscriptions are referred to below as different authorization levels. In other embodiments, the network node may apply the back-off timer selectively based on the observer uplink accessing behavior of the UE.

As discussed above, the triggering or the starting of the duration back-off timer may occur when the UE receives the back-off timer from the network node. In embodiments in which the UE is pre-configured with the back-off timer, the triggering or the starting of the duration back-off timer may occur when the indication is received from the network. In other embodiments, the triggering or the starting of the duration back-off timer may occur when the UE detaches from the network. In some embodiments, the UE may detach from the network after having received the back-off timer from the network node or upon receiving the indication to begin the pre-configured back-off timer from the network.

Figure 3:
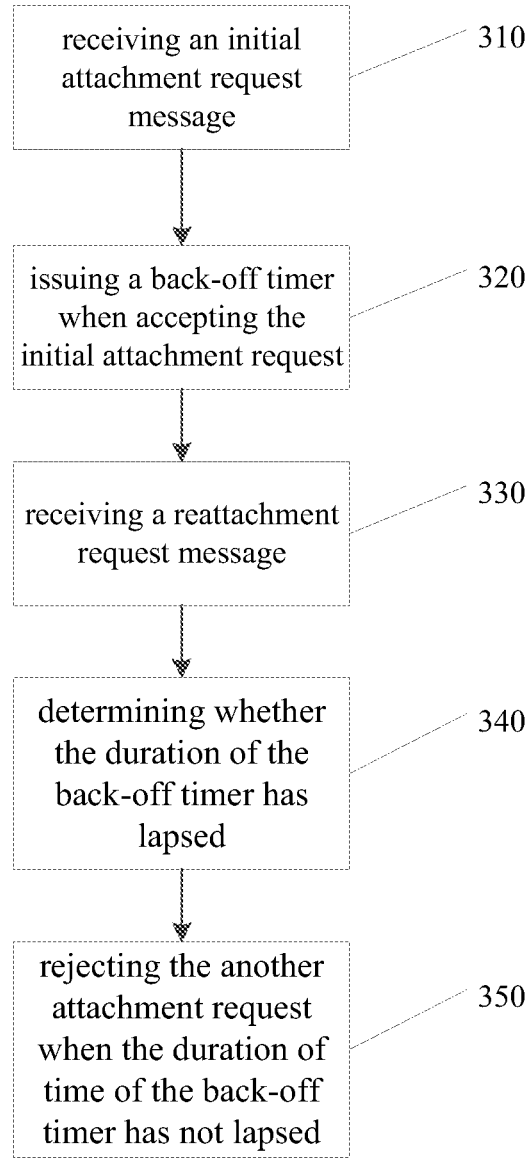
FIG. 3 illustrates an example of a method according to certain embodiments.

FIG. 3 illustrates a method according to certain embodiments. In particular, FIG. 3 illustrates a method performed by a network node. The network node, for example, may be a core network node such as an EPS MME or a 5G MMF. In step 310, the network node may receive an initial attachment request message from a UE. In step 320, the network node may accept the initial attachment request and issue a back-off timer associated with the UE. Issuing the back-off timer may include determining and transmitting the back-off timer to the user equipment. The back-off timer may include a duration of time in which the user equipment may not be allowed to attach or reattach to a network. In certain other embodiments, the network node may detect the back-off timer when the UE has been pre-configured with the back-off timer.

In some other embodiments, in which the network node issues the back-off timer when accepting the initial attachment request. In step 330, the network node may receive at the send the back-off timer to the UE, when the UE may not be pre-configured with the UE. In other embodiments, the network node may send an indication to the UE to start the duration of the back-off timer. In step 340, the network node may determine whether the duration of the back-off timer has lapsed. In step 350, the network node may reject the another attachment request from the UE when the duration of time of the back-off timer has not lapsed. When the duration of the back-off timer has lapsed, the network node may allow the user equipment to reattach to the network. Once the UE is allowed to reattach to the network, the UE may attach to the network and the network node may reset the rate control quota of the user equipment. The rate control quota may allow the UE to transmit to the network a finite number of messages during a given time period. For examples, in FIGS. 1 and 2 the rate control quotas were 5 messages per hour. The duration of the back-off timer may be based on the time associated with the rate control quota.

Figure 4:
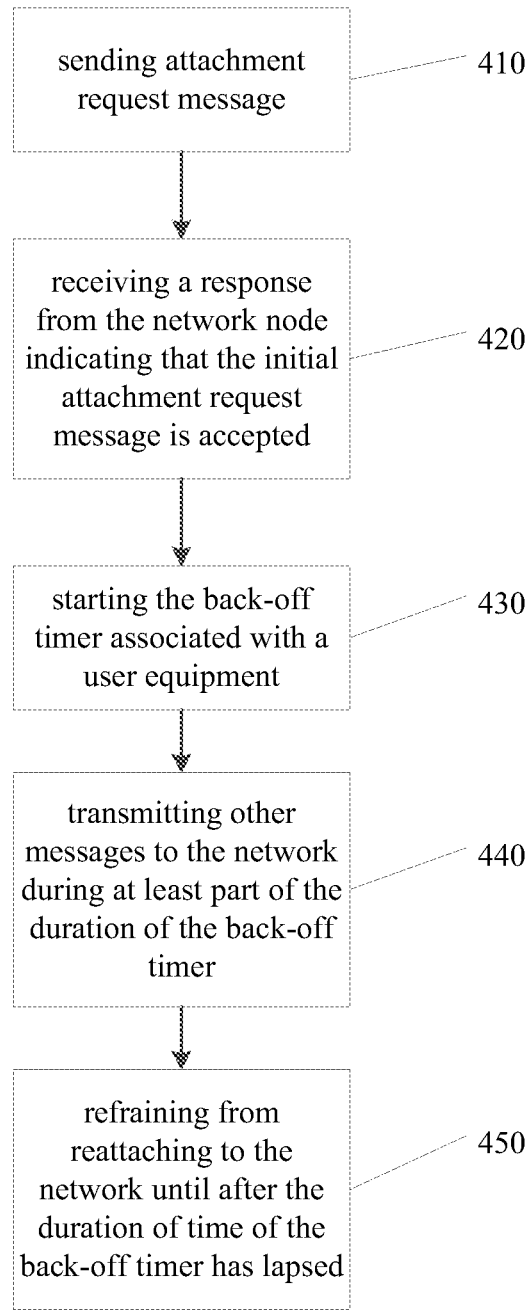
FIG. 4 illustrates an example of a method according to certain embodiments.

FIG. 4 illustrates a method according to certain embodiments. In particular, FIG. 4 illustrates a method performed by the UE. In step 410, the UE may send the network node an initial attachment request message. In step 420, the UE may receive a response from the network node indicating that the initial attachment request message has been accepted. The response may in some embodiments include the back-off timer, when the back-off timer may have been determined by the network node. In other embodiments, when the UE is pre-configured with the back-off timer, the response may include an indication of the back-off timer from the network node. Receiving the indication or the black-off timer may trigger the start of the back-off timer associated with the UE, as shown in step 430. The UE may then receive a response that may include the back-off timer, which may start the back-off timer.

In step 440, the UE may transmit other messages to the network during at least part of the duration of the back-off timer. The messages may be any message other than another attachment request message. Such transmissions may be limited by a rate controller quota. In step 450, the UE may refrain from attaching or reattaching to the network until after the duration of time of the back-off timer has lapsed. After the duration of the back-off timer has lapsed, the UE may send another request message to the network node.

Figure 5:
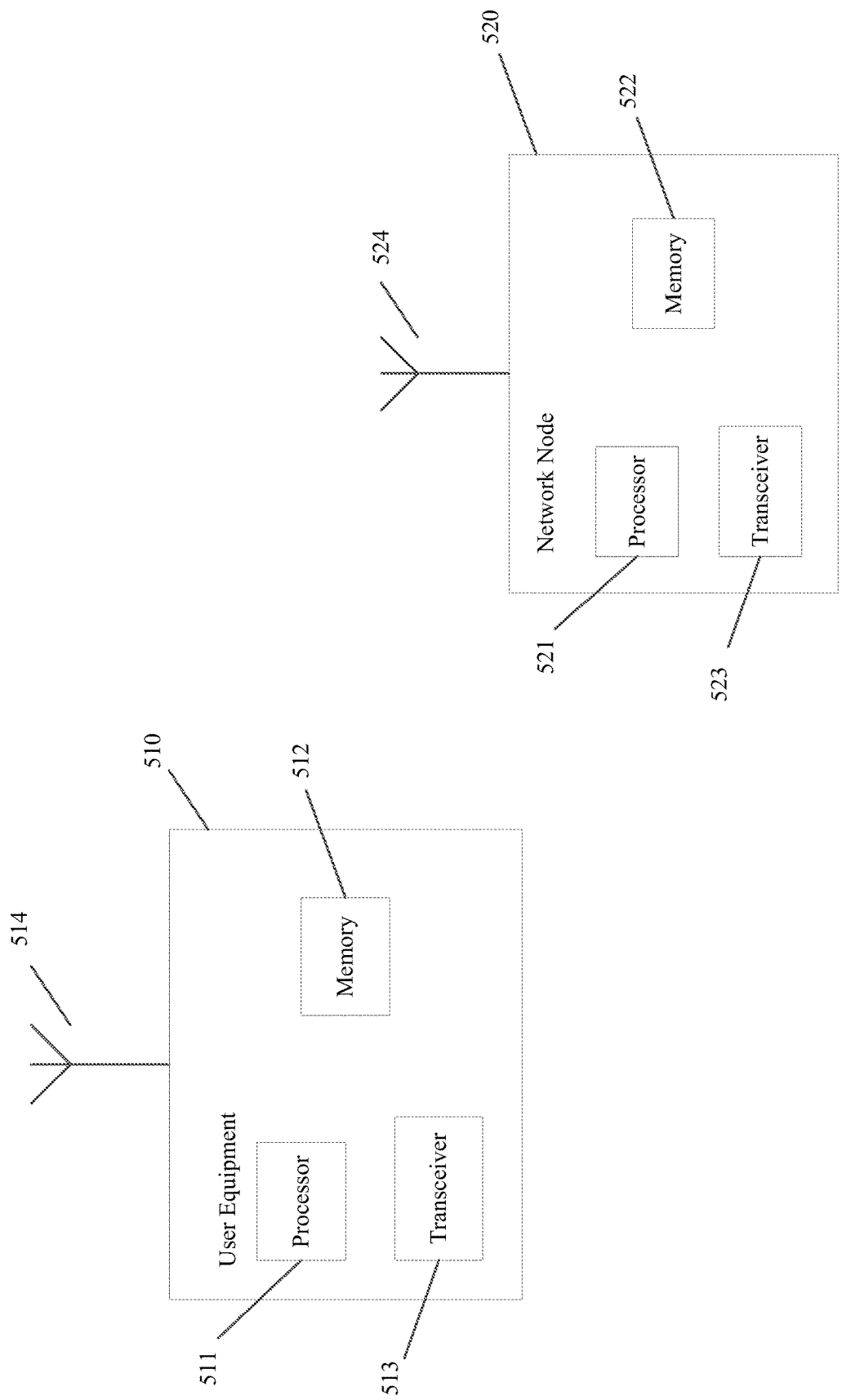
FIG. 5 illustrates an example of a system according to certain embodiments.

FIG. 5 illustrates a system according to certain embodiments. It should be understood that each signal or block in FIGS. 1-4 may be implemented by various means or their combinations, such as hardware, software, firmware, one or more processors and/or circuitry. In one embodiment, a system may include several devices, such as, for example, network node 520 or user equipment (UE) 510. The system may include more than one UE 510 and more than one network node 520. Network node 520 may be an access point, an access node, a 5G MME, and EPS MME, a server, a host, or any other network core entity that may communicate with the UE.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Other configurations of these devices, for example, may be provided. For example, network entity 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner In other words, division of labor may vary case by case. One possible use is to make a network node deliver local content. One or more functionalities may also be implemented as virtual application(s) in software that can run on a server.

A user device or UE 510 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a user equipment or a network node, may include means for carrying out embodiments described above in relation to FIGS. 1-4. In certain embodiments, at least one memory including computer program code can be configured to, with the at least one processor, cause the apparatus at least to perform any of the processes described herein.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 520 or UE 510, to perform any of the processes described above (see, for example, FIGS. 1-4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 5 illustrates a system including a network node 520 and UE 510, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 510 may likewise be provided with a variety of configurations for communication other than communicating with network node 520. For example, the UE 510 may be configured for device-to-device, machine-to-machine, or vehicle-to-vehicle communication.

The above embodiments provide for significant improvements to the functioning of a network and/or to the functioning of the network entities within the network, or the user equipment communicating with the network. In certain embodiments, controlling the network access frequency of a UE, such as reattachment or re-registration of a UE to the same network, may help to lower network signaling. The above embodiments can also help to prevent a UE from bypassing the rate control limit or quota imposed by the network, and to ensure an equitable distribution of network resources to all UEs.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to EPS technology, IoT technology, 4G technology, and 5G technology, the above embodiments may apply to any 3GPP technology.

Partial Glossary

IoT internet of things
UE user equipment
PLMN public land mobile network
3GPP third generation partnership project
EPS evolved packet system
MME mobile management entity
5G $5^{th}$ generation
RC rate control
APN access point name
SPLMN serving public land mobile network
NAS non-access stratum
RRC radio resource control
TAU tracking area update

We claim:

1. A method, comprising:
receiving at a network node an initial attachment request message from a user equipment;
issuing a back-off timer when accepting the initial attachment request from the user equipment and allowing the user equipment to attach to a network, wherein the back-off timer comprises a duration of time in which the user equipment is not allowed to reattach to the network, wherein the duration of the back-off timer starts when the user equipment detaches from the network from an attached state to a detached state, and wherein the user equipment is allowed to reattach to the network once the back-off timer has lapsed;

receiving at the network node another attachment request message from the user equipment;

determining whether the duration of the back-off timer has lapsed;

rejecting the another attachment request from the user equipment when the duration of time of the back-off timer has not lapsed; and allowing the user equipment to reattach to the network in response to the another attachment request from the user equipment when the duration of the back-off timer has lapsed.

2. The method according to claim 1, wherein the issuing of the back-off timer includes either sending the user equipment the back-off timer that has been determined by the network node or sending the user equipment an indication to use a pre-configured timer.

3. The method according to claim 1, further comprising: reattaching the user equipment to the network after the user equipment is allowed to reattach to the network.

4. The method according to claim 1, wherein the duration of the back-off timer is based in part on another duration of a rate control limit or quota imposed by the network.

5. The method according to claim 1, further comprising: sending the back-off timer to the user equipment from the network node, without rejecting the reattachment request received from the user equipment.

6. The method according to claim 1, further comprising: receiving transmissions other than the another attachment request from the user equipment during at least part of the duration of the back-off timer when the user equipment is still attached to the network.

7. The method according to claim 1, further comprising: limiting an amount of data transmitted to the user equipment and from the user equipment before reattachment of the user equipment to the network.

8. The method according to claim 1, further comprising: sending a response to the user equipment indicating the rejection of the another attachment request, wherein the response comprises the back-off timer.

9. The method according to claim 1, further comprising: reattaching the user equipment during the duration of the back-off timer when the user equipment is prioritized, wherein the another attachment request message comprises an indication that the user equipment is authorized as a prioritized user equipment.

10. The method according to claim 1, further comprising: keeping track of the duration of the back-off timer at the network node.

11. The method according to claim 1, further comprising: determining the duration of the back-off timer based on different authorization levels of the user equipment.

12. A method, comprising:
sending from a user equipment to a network node an initial attachment request message;
receiving a response from the network node indicating that the initial attachment request message is accepted and that the user equipment is attached or attaching to a network, wherein the response further comprises a back-off timer or an indication of the back-off timer, and wherein the back-off timer comprises a duration of time in which the user equipment is not allowed to reattach to the network, and wherein the user equipment is allowed to reattach to the network once the back-off timer has lapsed;

starting the back-off timer associated with the user equipment upon detachment from the network from an attached state to a detached state;
refraining from reattaching to the network until after the duration of time of the back-off timer lapsed; and
sending from the user equipment to the network node another attachment request message after the duration of the back-off timer has lapsed.

13. The method according to claim 12, wherein the duration of the back-off timer is based in part on another duration of a rate control limit or quota imposed by the network.

14. The method according to claim 12, further comprising: transmitting messages other than another attachment request from the user equipment to the network during at least part of the duration of the back-off timer when the user equipment is still attached to the network.

15. An apparatus comprising:
at least one processor; and
at least one memory including computer program code,
wherein the at least one memory and the computer program code are configured to, with the at least one processor, cause the apparatus at least to:
receive at a network node an initial attachment request message from a user equipment;
issue a back-off timer when accepting the initial attachment request from the user equipment and allowing the user equipment to attach to a network, wherein the back-off timer comprises a duration of time in which the user equipment is not allowed to reattach to the network, wherein the duration of the back-off timer starts when the user equipment detaches from the network from an attached state to a detached state, and wherein the user equipment is allowed to reattach to the network once the back-off timer has lapsed;
receive at the network node another attachment request message from the user equipment;
determine whether the duration of the back-off timer has lapsed;
reject the another attachment request from the user equipment when the duration of time of the back-off timer has not lapsed; and
allow the user equipment to reattach to the network in response to the another attachment request from the user equipment when the duration of the back-off timer has lapsed.

16. A non-transitory computer-readable medium encoded with instructions that, when executed in hardware, cause the hardware to:
receiving at a network node an initial attachment request message from a user equipment;
issuing a back-off timer when accepting the initial attachment request from the user equipment and allowing the user equipment to attach to a network, wherein the back-off timer comprises a duration of time in which the user equipment is not allowed to reattach to the network, wherein the duration of the back-off timer starts when the user equipment detaches from the network from an attached state to a detached state, and wherein the user equipment is allowed to reattach to the network once the back-off timer has lapsed;
receiving at the network node another attachment request message from the user equipment;
determining whether the duration of the back-off timer has lapsed;

rejecting the another attachment request from the user equipment when the duration of time of the back-off timer has not lapsed; and allowing the user equipment to reattach to the network in response to the another attachment request from the user equipment when the duration of the back-off timer has lapsed.

17. A computer program product comprising a non-transitory computer-readable medium encoded with instructions that, when executed in hardware, cause the hardware to:

sending from a user equipment to a network node an initial attachment request message;

receiving a response from the network node indicating that the initial attachment request message is accepted and that the user equipment is attached or attaching to a network, wherein the response further comprises a back-off timer or an indication of the back-off timer, and wherein the back-off timer comprises a duration of time in which the user equipment is not allowed to reattach to the network, and wherein the user equipment is allowed to reattach to the network once the back-off timer has lapsed;

starting the back-off timer associated with the user equipment upon detachment from the network from an attached state to a detached state;

refraining from reattaching to the network until after the duration of time of the back-off timer lapsed; and sending from the user equipment to the network node another attachment request message after the duration of the back-off timer has lapsed.

* * * * *